United States Patent
Benhammou et al.

(10) Patent No.: US 7,395,435 B2
(45) Date of Patent: *Jul. 1, 2008

(54) SECURE MEMORY DEVICE FOR SMART CARDS

(75) Inventors: Jean P. Benhammou, Colorado Springs, CO (US); Vincent C. Colnot, Dublin, CA (US); David J. Moore, Meudon (FR)

(73) Assignee: Atmel Corporation, San Jose, CA (US)

( * ) Notice: Subject to any disclaimer, the term of this patent is extended or adjusted under 35 U.S.C. 154(b) by 701 days.

This patent is subject to a terminal disclaimer.

(21) Appl. No.: 10/251,401

(22) Filed: Sep. 20, 2002

(65) Prior Publication Data

US 2004/0059925 A1    Mar. 25, 2004

(51) Int. Cl.
H04K 1/00 (2006.01)
H04L 9/00 (2006.01)
H04L 9/32 (2006.01)
G06F 7/04 (2006.01)

(52) U.S. Cl. .................. 713/185; 713/168; 713/169; 713/170; 713/171; 713/172; 713/182; 713/183; 713/184; 713/189; 726/16; 726/17; 726/18; 726/19; 726/20; 726/27; 726/28; 726/29; 726/30

(58) Field of Classification Search .......... 726/16–20, 726/27–30; 713/168–172, 182–185, 189; 380/283, 284
See application file for complete search history.

(56) References Cited

U.S. PATENT DOCUMENTS

| 4,612,413 | A |   | 9/1986  | Robert et al. |
| 5,325,430 | A | * | 6/1994  | Smyth et al. ................ 713/192 |
| 5,461,217 | A |   | 10/1995 | Claus |
| 5,467,081 | A |   | 11/1995 | Drews et al. |
| 5,544,246 | A | * | 8/1996  | Mandelbaum et al. ........ 705/65 |
| 5,594,793 | A |   | 1/1997  | Bahout |
| 5,613,159 | A |   | 3/1997  | Colnot |
| 5,696,827 | A |   | 12/1997 | Brands |
| 5,832,090 | A |   | 11/1998 | Raspotnik |
| 5,852,290 | A |   | 12/1998 | Chaney |
| 5,949,882 | A |   | 9/1999  | Angelo |
| 5,953,422 | A |   | 9/1999  | Angelo et al. |
| 5,991,519 | A |   | 11/1999 | Benhammou et al. |
| 6,094,724 | A | * | 7/2000  | Benhammou et al. ......... 726/20 |
| 6,577,229 | B1 | * | 6/2003 | Bonneau et al. .......... 340/10.41 |
| 6,618,789 | B1 | * | 9/2003 | Okaue et al. ................ 711/103 |
| 6,697,945 | B2 | * | 2/2004 | Ishiguro et al. ............. 713/171 |
| 2003/0028484 | A1 | * | 2/2003 | Boylan et al. ................. 705/40 |

OTHER PUBLICATIONS

ATMEL AT88SC1608 (8×256×8 Secure Memory with Authentication, 1999).*

* cited by examiner

Primary Examiner—Longbit Chai
(74) Attorney, Agent, or Firm—Schwegman, Lundberg, & Woessner, P.A.

(57) ABSTRACT

A secure memory device which can be used for multi-application smart cards for secure identification in data transfer, or for component verification in a computer system, without the requirement of an internal microprocessor. The secure memory device features a dual authentication protocol in which the memory and host authenticate each other. The secure memory device also includes an encrypted password feature, as well as using stream encryption to encrypt the data.

6 Claims, 5 Drawing Sheets

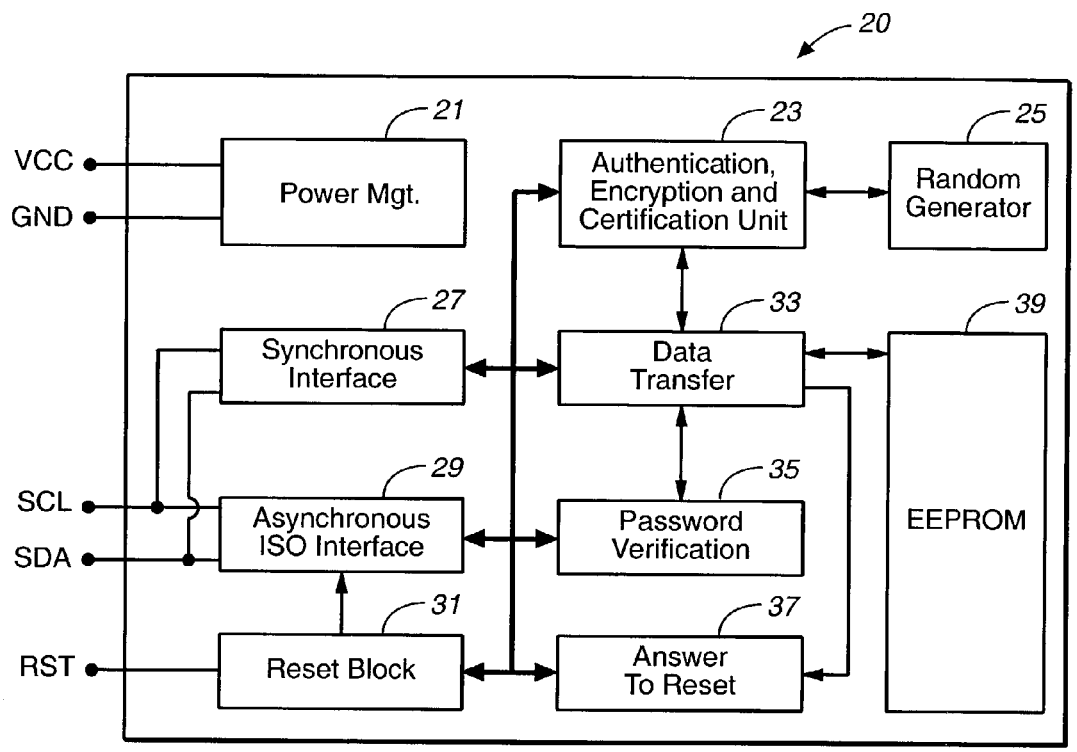
FIG._1
FIG._2A

110 — 100

| CONFIGURATION | $0 | $1 | $2 | $3 | $4 | $5 | $6 | $7 | |
|---|---|---|---|---|---|---|---|---|---|
| Fabrication 112 | Answer To Reset ||||||||  $00 |
| | Fab Code || MTZ || Card Manufacturer Code |||| $08 |
| | Lot History Code |||||||| $10 |
| Access 114 | DCR | Identification Number Nc ||||||| $18 |
| | AR0 | PR0 | AR1 | PR1 | AR2 | PR2 | AR3 | PR3 | $20 |
| | AR4 | PR4 | AR5 | PR5 | AR6 | PR6 | AR7 | PR7 | $28 |
| | AR8 | PR8 | AR9 | PR9 | AR10 | PR10 | AR11 | PR11 | $30 |
| | AR12 | PR12 | AR13 | PR13 | AR14 | PR14 | AR15 | PR15 | $38 |
| Identification 116 | Issuer Code |||||||| $40 |
| | |||||||| $48 |
| | AAC0 | Cryptogram Ci0 ||||||| $50 |
| | Session Encryption Key Sk0 |||||||| $58 |
| | AAC1 | Cryptogram Ci1 ||||||| $60 |
| | Session Encryption Key Sk1 |||||||| $68 |
| | AAC2 | Cryptogram Ci2 ||||||| $70 |
| | Session Encryption Key Sk2 |||||||| $78 |
| | AAC3 | Cryptogram Ci3 ||||||| $80 |
| | Session Encryption Key Sk3 |||||||| $88 |
| Secret 118 | Secret Seed G0 |||||||| $90 |
| | Secret Seed G1 |||||||| $98 |
| | Secret Seed G2 |||||||| $A0 |
| | Secret Seed G3 |||||||| $A8 |
| Passwords 120 | PAC | Write 0 ||| PAC | Read 0 ||| $B0 |
| | PAC | Write 1 ||| PAC | Read 1 ||| $B8 |
| | PAC | Write 2 ||| PAC | Read 2 ||| $C0 |
| | PAC | Write 3 ||| PAC | Read 3 ||| $C8 |
| | PAC | Write 4 ||| PAC | Read 4 ||| $D0 |
| | PAC | Write 5 ||| PAC | Read 5 ||| $D8 |
| | PAC | Write 6 ||| PAC | Read 6 ||| $E0 |
| | PAC | Write 7 ||| PAC | Read 7 ||| $E8 |
| System | Reserved |||||||| $F0 |
| | |||||||| $F8 |

| Bit 7 | Bit 6 | Bit 5 | Bit 4 | Bit 3 | Bit 2 | Bit 1 | Bit 0 |
|---|---|---|---|---|---|---|---|
| 0 | 0 | 0 | 0 | SEC | PER | CMA | FAB |

| Bit 7 | Bit 6 | Bit 5 | Bit 4 | Bit 3 | Bit 2 | Bit 1 | Bit 0 |
|---|---|---|---|---|---|---|---|
| PM1 | PM0 | AM1 | AM0 | ER | WLM | MDF | PGO |

FIG._3B

| PM1 | PM0 | Access |
|---|---|---|
| 1 | 1 | Free |
| 1 | 0 | Write Password Required |
| 0 | * | Read and Write Password Required |

FIG._3C

| AM1 | AM0 | Access |
|---|---|---|
| 1 | 1 | Free |
| 1 | 0 | Authentication for Write |
| 0 | 1 | Normal Authentication Mode |
| 0 | 0 | Dual Access Mode |

| ZONE | Access | SEC = 0 | FAB = 0 | CMA = 0 | PER = 0 |
|---|---|---|---|---|---|
| Fabrication (Except MTZ, CMC and LHC) | Read | Free | Free | Free | Free |
| | Write | Secure Code | Forbidden | Forbidden | Forbidden |
| Memory Test Zone (MTZ) | Read | Free | Free | Free | Free |
| | Write | | | | |
| Card Manufacturer Code (CMC) | Read | Free | Free | Free | Free |
| | Write | Secure Code | Secure Code | Forbidden | Forbidden |
| Lot History Code (LHC) | Read | Free | Free | Free | Free |
| | Write | Forbidden | Forbidden | Forbidden | Forbidden |
| Identification (Except Sk) | Read | Free | Free | Free | Free |
| | Write | Secure Code | Secure Code | Secure Code | Forbidden |
| Encryption Keys (Sk) | Read | Secure Code | Secure Code | Secure Code | Forbidden |
| | Write | | | | |
| Secret | Read | Secure Code | Secure Code | Secure Code | Forbidden |
| | Write | | | | |
| Passwords (Write and Read) | Read | Secure Code | Secure Code | Secure Code | Write Pw |
| | Write | | | | |
| Passwords (PAC) | Read | Free | Free | Free | Free |
| | Write | Secure Code | Secure Code | Secure Code | Write Pw |
| System | Read | Forbidden | Forbidden | Forbidden | Forbidden |
| | Write | | | | |
| User Zones | Read | AR | AR | AR | AR |
| | Write | | | | |

| Bit 7 | Bit 6 | Bit 5 | Bit 4 | Bit 3 | Bit 2 | Bit 1 | Bit 0 |
|---|---|---|---|---|---|---|---|
| AK1 | AK0 | POK1 | POK0 | *Res* | PW2 | PW1 | PW0 |

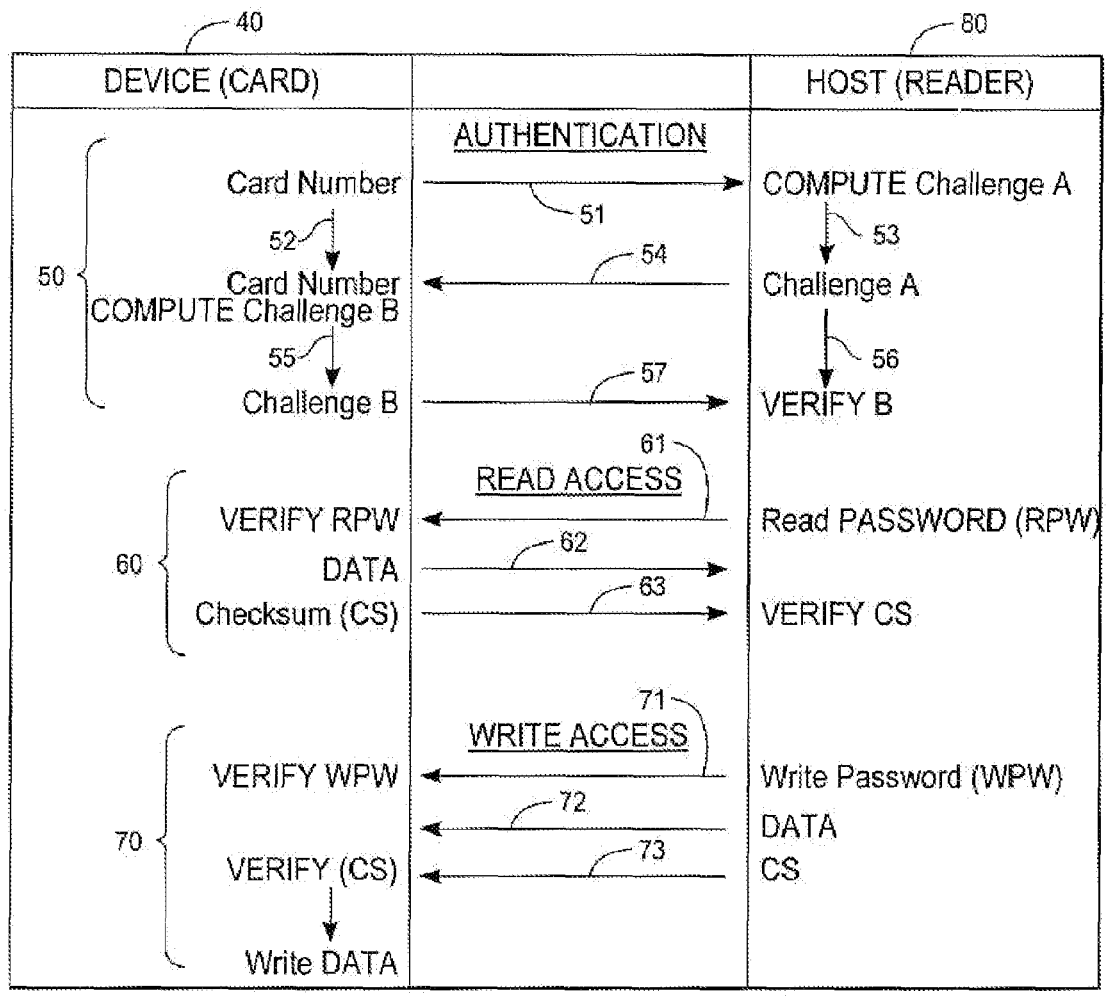
FIG._6
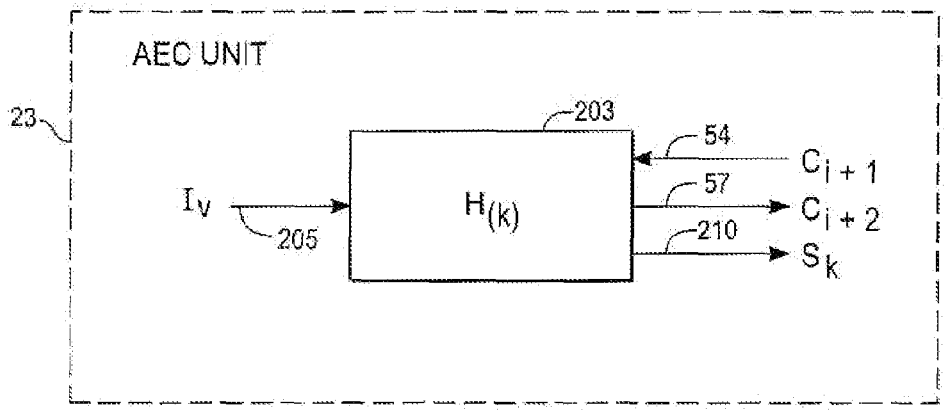
FIG._7

SECURE MEMORY DEVICE FOR SMART CARDS

TECHNICAL FIELD

The present invention relates to secure memories, and more specifically to secure memory devices which do not incorporate an internal microprocessor.

BACKGROUND ART

Integrated circuit (IC) cards, commonly referred to as "smart cards" are widely used for data access protection. The smart card is generally a plastic card with a secure memory or microcontroller built into the card. The storage area of the secure memory is often divided into blocks of memory. The object of providing security to a memory is to protect against unauthorized access to and tampering with the data stored in these blocks of memory.

Smart cards have been used in a variety of applications. Some of these applications include, for example, electronic cash cards, in which monetary values are stored on the card to conduct electronic commerce, pre-paid telephone cards, in which a prepaid monetary value is stored on the card and is deducted by the appropriate amount during telephone use, and customer loyalty cards, in which a customer receives points from purchases at a grocery store, gas station, etc. . . . and then the points are accumulated on the card and are later exchanged for prizes, monetary discounts, or other benefits. Obviously, it is important to the institution who issued the card, be it a bank, phone company, or grocery store, as well as to the consumer using the card, that the smart card be secure from unscrupulous people who would attempt to tamper with or gain unauthorized access to the data on the card.

Many cryptology methods have been used to provide security to the data on the smart cards. In cryptology, the plain text message, which often is computer data in binary streams of 1's and 0's, is transformed under the control of a key, known only to the legitimate communicants, into ciphertext or encrypted data. Cryptology is used for a number of security functions of the smart card. For example, the user must corroborate his identity to the card each time that a transaction is made. Typically, the card and the card reader execute a sequence of encrypted sign/countersign-like exchanges to verify that each is dealing with a legitimate counterpart. Once this exchange is carried out, then the transaction itself is carried out in encrypted form to prevent anyone, including the card holder or the merchant whose card reader is involved, from eavesdropping on the exchange and then later impersonating either party to defraud the system. This cryptology security protocol is usually carried out in such a way that it is transparent to the user, except for the necessity of entering a password or PIN to initiate the transaction.

The majority of smart cards presently available incorporate an internal microprocessor in order to carry out the authentication and security functions. However, microprocessor-based smart cards are expensive, and thus are not normally used for inexpensive, large-scale consumer products.

It is the object of the present invention to provide a secure memory device for a smart card which is not microprocessor-based such that the smart card can be used for inexpensive consumer products.

It is a further object of the invention to provide a secure memory device that provides excellent data security that is comparable to microprocessor-based smart cards.

SUMMARY OF THE INVENTION

The above objects have been achieved by a secure memory device which can be used for multi-application smart cards, for secure identification in data transfer or for component verification in a computer system, without the requirement of an internal microprocessor. The secure memory device features a dual authentication protocol in which the memory and host authenticate each other. The secure memory device also includes an encrypted password feature, as well as using stream encryption to encrypt the data. The embedded authentication protocol allows the memory and the host to authenticate each other. The device and host exchange a series of numerical "challenges" issued from a random number generator and verify their values through a specific cryptographic function included in each part. When both agree on the same result, then access to the memory is permitted.

BRIEF DESCRIPTION OF THE DRAWINGS

FIG. 1 is a block diagram of the general architecture of a secure memory device according to the present invention.

FIGS. 2A, 2B and 2C depict a memory map of the EEPROM memory used in the secure memory device of FIG. 1.

FIG. 3A illustrates a configuration register for access control to user zones in the EEPROM memory of FIG. 2.

FIGS. 3B and 3C are charts providing a bit key for bits 7-6 (PM1 and PM0) and 5-4 (AM1 and AM0), respectively, for the configuration register in FIG. 3A.

FIG. 4 is a chart illustrating the status of the memory zones in the EEPROM memory of FIG. 2.

FIG. 5 is a configuration register for password registers in the EEPROM memory of FIG. 2.

FIG. 6 is a chart showing the authentication read access and write access protocols of the secure memory device.

FIG. 7 is a block diagram of the hash function block within the Authentication, Encryption and Certification unit of the secure memory device of FIG. 1.

BEST MODE FOR CARRYING OUT THE INVENTION

With reference to FIG. 1, the architecture of the secure memory device 20 of the present invention is shown. Illustrated in the secure memory 20, are blocks for synchronous 27 and asynchronous 29 interfaces, power management 21, a reset block 31, and an answer to reset block 37, an authentication, encryption and certification (AEC) unit 23, data transfer 33, password verification 35, a random number generator 25 and an EEPROM memory 39. The secure memory 20 has 5 pins, namely Vcc, ground (GND), serial clock (SCL), serial data (SDA), and reset (RST). Vcc and GND are connected to the power management block 21, and SCL, SDA, and RST are connected to both of the interfaces 27, 29.

In the preferred embodiment, the Vcc input is a 2.7 volt to 5.5 volt positive voltage supplied by the secure memory reader, otherwise known as the host device. When the synchronous protocol is used, the SCL input is used to positive edge clock data into the secure memory device and negative edge clock data out of the device. In the asynchronous T=0 protocol, the SCL input is used to provide the secure memory device with a carrier frequency f. The nominal length of one bit emitted on the input/output (I/O) is defined as an "elementary time unit" (ETU) and is equal to 372/f. The SDA pin is bidirectional for serial data transfer. This pin is open-drain driven and may be wire-ORed with other open drain or open collector devices. Up to 15 devices may be wire-ORed together. An external pull up resistor should be connected between the SDA and Vcc pins. The value of this resistor and the system capacitance loading the SDA bus will determine the rise time of the SDA. This rise time will determine the maximum frequency during read operations. Low value pull-up resistors will allow higher frequency operations while drawing higher average supply currents. When the RST input is pulsed high, the secured memory 20 will output the data programmed into a 64 bit (8 byte) answer to reset register in a EEPROM memory in a data stream conforming to the ISO 7816-3 asynchronous answer to reset protocol. When the secure memory 20 is unlocked, the well known ISO two-wire serial protocol or the asynchronous T=0 protocol is used with its respective interface 27, 29, using pins SDA and SCL. The implementation of the synchronous interface, asynchronous ISO interface, and answer to reset blocks are well within the level of skill of those of ordinary skill in the art, and are not discussed in detail herein.

As discussed above, the secure memory device is compatible with two different communication protocols, an asynchronous T=0 protocol (ISO 7816-3) or a synchronous two-wire protocol. Both of these protocols are well known in the art. The power up sequence determines which of the two protocols will be used. To enable the asynchronous ISO interface 29, the power up sequence should be compliant with paragraph 5.1 of ISO 7816-3: RST low, power up Vcc, set I/O-SDA in receiving mode, and provide stable CLK-SCL. To enable the synchronous two-wire interface 27, the following power up sequence should be carried out: RST and CLK-SCL high, power up Vcc.

In preventing the unauthorized access to the EEPROM memory 39, two potential instances of authorized access must be addressed. The first instance arises because of the transmittal of the secure memory from the manufacturer of the secure memory to the card manufacturer or transmittal of the smart card from the card manufacturer to the current issuer. To prevent the unauthorized use of the secure memory prior to the time it is personalized by the card issuer for the end user, a security code, typically referred to as a transport code, determined by the manufacturer and conveyed to the card manufacturer and the current issuer must be used to gain access to the secure memory. In a second instance, security must be provided to ensure that the end user is authorized to use the smart card, and further that both the smart card and the smart card reader are authentic.

With reference to FIGS. 2A, 2B and 2C, a memory map 100 indicating the various memory partitions made to a typical EEPROM memory 39 is set forth. In the memory map 100, the address in the EEPROM memory 39 of each memory partition is identified along with the number of bytes for each of the memory partitions. For example, user zone 0 is found at addresses 0 through 07F (HEX) in the memory map 30 and is allocated 128 bytes. The number of user zones and the number of bytes per user zone may vary for different devices. For example, another device might have 4 user zones of 64 bytes each or 16 user zones of 256 bytes each. The memory map 100 of the EEPROM memory 39 has been divided into three sections for explanation purposes. Section 105 of the memory map 100, shown in FIG. 2A, is partitioned into sixteen user zones (users 0 to 15) of 128 bytes each. Section 130 of the memory map, shown in FIG. 2C, is a fuse zone configured as an 8-bit register and will be discussed in further detail below. Section 110 of the memory map 100, shown in FIG. 2B, contains partitions of a configuration zone. The partitions in section 110 are here labeled as a fabrication zone 112, an access zone 114, an identification zone 116, a secret seed zone 118, and a password zone 120. A reserved section for the system is also shown. Several of these partitions have further partitions that will be discussed below. The size and location of these zones and further partitions may vary for different devices. The particular partitions given here by may of example are typical.

The fabrication zone 112 is typically partitioned into an Answer to Reset, Fab Code, a Memory Test Zone (MTZ), a Card Manufacturer Code, and a Lot History Code. The Answer to Reset is a 64-bit register, the Fab Code is a 16-bit register, and then Lot History Code is a 64-bit register. The contents of these registers are programmed by the manufacturer of the secure memory chip. Once these registers have been programmed, and a "fuse" dedicated to the secured memory manufacturer is blown, as will be described below, the content of these registers can be read, but not altered. The Memory Test Zone (MTZ) is two bytes that are made available for memory and protocol test. The Card Manufacturer Code is a 32-bit register whose contents can be programmed by the smart card manufacturer on the presentation of a valid security code. As set forth above, the security code acts to secure transportation between the secured memory chip manufacturer and the smart card manufacturer. Once this register has been programmed, and a "fuse" dedicated to the smart card manufacturer is blown, the content of this register can be read, but not altered.

The access zone 114 is typically partitioned into an 8-bit device configuration register (DCR), a 56-bit identification number, sixteen 8-bit access registers, and sixteen 8-bit password/key registers. The identification number is defined by the card issuer and is different for each card. Each of the access registers is a configuration register that controls the operations that can be performed in one of the user zones and the security tests that must be satisfied before those operations can be performed. Each of the access registers may be programmed upon the presentation of a valid security code up until the time the fuse dedicated to the smart card issuer is blown. The access registers may be freely read.

With reference to FIG. 3A, a typical access register 150 is shown. The configuration bits, bits 0 through bit 7 in access register 150 are program only (PGO), modify forbidden (MDF), write lock mode (WLM), encryption required (ER), authentication mode (AM1, AM0), and password mode (PM1, PM0). When the program only configuration bit is set (PGO="0"), the contents of the associated user zone may only be written (data bits changed from "1" to "0", but never from "0" to "1"). When the modify forbidden configuration bit is set (MDF "0"), the contents of the associated user zone cannot be changed. The user zone must be written before this bit is set, and therefore before the end of the personalization stage. The write lock mode bit, if enabled (WLM="0"), divides the user zone into eight byte pages. The first byte of each page is called the write lock byte and will define the lock/unlocked status for each byte in the page. Write access is forbidden to a byte if its associated bit in byte 0 is set to "0". Bit 7 controls byte 7, bit 6 controls byte 6, etc. When the encryption required (ER) bit is set to "0", the host is required to activate the encryption mode in order to read/write the corresponding user zone. No data may be read from or written to the zone in the clear. When the ER bit is set to "1", the host may activate the encryption mode if desired but is not specifically required to do so by the device.

The authentication mode bits (AM1, AM0) determine whether authentication is required for access to the zone. FIG. 3C shows the possible settings. When the AM bits are "11", no authentication is required for access to the zone. When the AM bits are "10", authentication is required only for write access; read access is free. When AM bits are "01", authentication is required for both read and write access. In both of these configurations, the secret seed required is specified by the authentication key (AK) in the corresponding password/key register (PR0 to PR15). Finally, when the AM bits are "00", a special mode is implemented in which authentication using the program only key (POK) gives a right to read and to program the zone (i.e., write "0" only) while authentication using the AK gives full read and write access to the zone. In this way, a token application may be implemented, whereby regular hosts with knowledge of POK may decrement the stored value, and only master hosts with knowledge of AK may reset the token to its full value.

The password mode bits (PM1, PM0) determine whether passwords are required for access to the zone. FIG. 3B shows the possible settings. When the PM bits are "11", no password is required for access to the zone. When the PM bits are "10", the write password is required for write access; read access is free (subject to authentication requirements being satisfied). When PM1="0", the write password is required for read/write access and the read password is required for read-only access. The required password set is specified by PW(3:0) in the corresponding passwords/keys register (PR0 to PR15). Verification of the write password also allows the read and write passwords to be changed.

Referring back to FIG. 2B, the access zone also is partitioned into sixteen 8-bit password/key registers (PR0 to PR15), which are defined by the issuer, one for each user zone. With reference to FIG. 5, a typical password/key register is shown. The configuration bits, bit 0 through bit 7, include three bits of password sets (PW0 through PW2) which define which of the eight password sets must be presented to allow access to the user zone. Each access register may point to a unique password set, or access registers for multiple zones may point to the same password set. In this case, verification of a single password will open several zones, combining the zones into a larger zone. The password/key register also includes two configuration bits for the program only key (POK0 and POK1). When the user zone is a dual access zone (AM="00"), these bits define which of the four secret seeds G0-G3 must be used in an authentication to allow read and program access to the user zone. Again, several user zones may easily be combined into one large dual access zone, by setting the same access registers. Finally, there are two configuration bits defined as the authentication key bits (AK0 and AK1). These bits define which of the four secret seeds G0-G3 must be used in authentication to allow full access to the user zone. Each access register may point to a unique authentication secret, or access registers from multiple zones may point to the same authentication secret. In this case, authentication with a single secret seed will open several zones, combining the zones into a larger zone.

With reference to FIG. 2B, a typical identification zone 116 includes an issuer code, cryptogram zones, and session encryption keys. The issuer code is a 128-bit defined by the card issuer. The cryptogram zone consists of 56-bit cryptograms which are generated by the internal random generator and modified after each successful verification of a cryptogram by the chip, on host request. The initial values (Ci0 to Ci3), defined by the issuer are diversified as functions of the identification number. The session encryption keys (Sk0 to Sk3) are 64 bit keys which are generated by the internal random generator and modified after every successful verification of the cryptogram by the chip, on host request. There are four 4-bit attempts counters for the authentication protocol and the encryption activation (AAC). The attempts counters limit to four the number of consecutive incorrect code presentations and then causes the corresponding cryptogram code to be locked. A successful code presentation resets the attempts counter to zero.

The secret seed zone 118 contains 64-bit secret keys (G0 to G3) that are programmed by the smart card issuer upon the presentation of a valid security code. There are generated by the smart card issuer as functions of the identification number. Once the fuse dedicated to the smart card issuer is blown, the seeds may not be read or altered. The identification number may only be read upon the presentation of a valid security code.

Finally, the password zone 120 is typically partitioned into 8 sets of two 24-bit passwords for read and write operations, defined by the issuer. The write password allow modification of the read and write passwords of the same set. Associated with each of the sixteen passwords is a 4-bit password attempts counter (PAC). The passwords may be defined and read by the smart card issuer upon the presentation of a valid security code. After the fuse dedicated to the smart card issuer has been blown, a valid password would be required to access a user zone if the respective read or write password enable configuration bit in an access register has been set. Each program attempts counter, like the authentication attempts counters (AAC0 to AAC3) described above, is an 4-bit counter that prevents a systematic attack on the password that may be required before read and write access to selected user zones is permitted. Each time a password is presented for user comparison, an associated password attempt counter is incremented. If, after four attempts, the password comparison is unsuccessful, that password becomes completely locked and any zone whose access is controlled by this password cannot be accessed by anyone, including the secure memory manufacturer (other zones not dependent on that locked password will remain fully functional). Each time the password comparison is successful, the associated password attempts counter is reset to "0". The password attempt counters may be read by the smart card issuer upon the presentation of a valid security code. After the fuse dedicated to the smart card issuer has been blown, a particular password attempt counter associated with a user zone may only be written by the internal logic if the respective write password enable configuration bit and the appropriate access register has been set. The password attempt counters may be freely read.

With reference to FIG. 2C, as discussed above, section 130 of the memory map 100 is a fuse zone configured as a 8-bit register. Bits 0, 1, 2, and 3 are reserved for non-volatile fuses blown at the end of each card life step. Once blown, these EEPROM fuses cannot be reset. The SEC and FAB fuses (bits 0 and 3) are blown by the secure memory manufacturer prior to shipping the wafers to the card manufacturer. The CMA fuse (bit 1) is blown by the card manufacturer prior to shipping cards to the issuer. The PER fuse (bit 2) is blown by the issuer prior to shipping cards to the end user. When the fuses are all 1's, prior to blowing the fuses, read and write operations are allowed in the entire memory. With reference to FIG. 4, a chart 140 is shown indicating the status of each of the memory zones with reference to read and write access when the particular fuses (SEC, FAB, CMA and PER) are blown (i.e., set to "0").

With reference to FIGS. 1 and 7, the encryption mechanism within the authentication, encryption and certification unit 23 of the secure memory device of the present invention is shown. The encryption scheme for the secure memory is a stream encryption performed without a microprocessor. The system is based on a hash function H which may be keyed ($H_k$) or unkeyed depending on how it is initialized. In the present invention, this function is a sequential system of feedback shift registers and modular adders. After an initialization vector (IV) 205 has been shifted into the block, it produces a pseudo-random output stream that is IV dependent. If the initialization vector contains a secret key that is shared by the communicating entities, only those entities are capable of producing this output stream. The keyed function $H_k$ may be used to implement a secure bidirectional authentication protocol between two entities. With reference to FIGS. 6 and 7, the two entities in this case are a master host (reader) 80 and a slave device (card) 40. When an initialization vector (IV) 205 is shifted into the $H_k$ block 203, the function $H_k$ is keyed in the sense that the secret key $G_c$ is part of the IV. Other parameters included in the IV are a current cryptogram $C_i$ which is present in the device's EEPROM and a random number Q which is generated by the host and sent to the device. At the end of this initialization, the host and the device's $H_k$ blocks are in identical states.

The $H_k$ blocks are then used to compute three different values, the first value ($C_{i+1}$) 54 is used to authenticate the host, the second value ($C_{i+2}$) 57 is used to authenticate the device, and the third value is a session encryption key ($S_k$) 216. The value $C_{i+1}$ is sent by the host and verified by the device. If this check is successful, then the device computes $C_{i+2}$ and stores it in place of $C_i$. The host then reads the device's $C_{i+2}$ value and compares it with its own to authenticate the device. A new session encryption key $S_k$ is computed and stored by the host and the device during every successful authentication. Each session key may later be used to activate data encryption between both entities. With reference to FIG. 6, the authentication process 50 is shown. A card number is entered from the card 40 and is transmitted 51 to the host reader 80. The reader computes a mathematical number or "challenge" 53 and the challenge is transmitted 54 as the value $C_{i+1}$ to the card. The card verifies the mathematical number 52 and computes a second challenge, challenge B, which is the $C_{i+2}$ value, which is sent back to the card reader to verify the card.

Before the host and device can exchange encrypted data, and encryption activation needs to be carried out. This process is identical to the authentication described above, except that the session encryption key $S_k$ should be used instead of the authentication key $G_c$. Using a session key for encryption is more cryptographically secure than if the key were fixed. By having the key change every time a new session occurs, it makes it more difficult for a hacker to figure out what the key is in order to break the code. When the transmitter and receiver are synchronized, having gone through the same encryption activation, they may encrypt and decrypt data in cipher block chaining mode. The transmitter combines by using an exclusive OR gate, the non-encrypted data (plain text, $P_j$), with the output of the $H_k$ block to produce encrypted data (the cipher text, $C_j$). The receiver produces the same output key stream, and recovers the plain text by exclusive OR of the key stream with the cipher text. These equations are shown below:

Encryption: $C_o \leftarrow IV$. For $1 \leq j \leq t$, $C_j \leftarrow P_j \oplus H_k(C_j-1)$ Decryption: $C_o \leftarrow IV$. For $1 \leq j \leq t$, $P_j \leftarrow C_j \oplus H_k(C_j-1)$ The cipher-block chaining mode of operation is used not only because it increases the security of the device, but also because the feedback of ciphertext into the encryption function allows on-the-fly computation of message authentication code.

With reference to FIG. 6, the read access 60 and write access to protocols are shown. For read access 60, the encrypted read password 61 is transmitted from the reader 80 to the card 40. The read password is verified by the card and the data 62 is transmitted from the card 40 to the reader 80. The card has a data validity check function in the form of a checksum which may be implemented in standard or cryptographic mode. The checksum 63 is sent back from the card 40 to the card reader 80 which verifies the checksum. The standard mode for the checksum is identical to the cryptographic mode, except that $H_k$ block hasn't been initialized. The checksum is not secure in the standard mode, since no secret key is used to initialize the $H_k$ block. The cryptographic mode is more powerful since it provides bidirectional data integrity check and data origin authentication capability in a form of a message authentication code (MAC). Only the host/device that carried out a valid authentication is capable of computing a valid MAC. The cryptographic mode is automatically activated when a successful authentication is carried out. To write data to the device, the host is required to compute a valid MAC, appended to the data in place of the CRC. The host may then verify that the data was properly written to the memory by rereading it, and the device will append a new MAC to the outgoing data. When, during an incoming command, the device computes a MAC that is different from the MAC transmitted by the host, not only is the command abandoned, but the cryptographic mode is also reset. A new authentication would be performed to reactivate the cryptographic checksum.

As shown in FIG. 6, the write access 70 operates in a similar manner with the write password being sent 71 from the reader 80 to the card 40. The card verifies the write password and, if acceptable, the data is be sent 72 from the reader 80 to the card 40. A checksum 73 is then sent from the reader to the card. The checksum 73 is verified and, if approved, the data is then written 74 to the card.

The invention claimed is:

1. A secure memory device for a smart card, characterized by the absence of a microprocessor on the smart card, comprising:
   a bidirectional I/O terminal for transmitting data to and receiving data from an external host card reader;
   an EEPROM data storage unit having a plurality of memory zones, the data storage unit storing a number of READ access passwords and a number of WRITE access passwords; and
   a stream-encrypted authentication, encryption and certification (AEC) unit, located between the bidirectional I/O terminal and the EEPROM data storage unit, the stream-encrypted AEC unit having means for controlling access to data received at and transmitted from the bidirectional I/O terminal and including a hash function means for implementing a stream encryption technique to certify the authentication of a transaction between the smart card and the external host card reader, said stream-encrypted hash function means receiving an initialization vector which includes a secret key, and producing a card reader authentication value, a card authentication value and a session encryption key which changes after each authentication between the smart card and card reader, wherein the host card reader has means for supplying a stream-encrypted READ access password to the stream-encrypted AEC unit, the stream-encrypted AEC unit having means for verifying the stream-encrypted READ password from the store of READ access passwords and sending stream-encrypted data to the host card reader, the host card reader having means for accepting the stream-encrypted data, the host card reader having means for sending a stream-encrypted WRITE password to the smart card memory device and the smart card memory device having means for verifying the stream-encrypted WRITE password from the store of WRITE passwords and accepting stream-encrypted data.

2. A secure memory device, as in claim 1, further including a first communication interface to make the device compatible with a synchronous two-wire communication protocol, and a second communication interface to make the device compatible with an asynchronous communication protocol.

3. A secure memory device, as in claim 1, wherein the data storage unit includes an attempts counter which locks access to the memory device after a predetermined number of incorrect attempts at the password.

4. A secure memory device, as in claim 1, wherein the stream-encrypted hash function block includes a plurality of feedback shift registers and modular adders connected in a sequential manner for stream encryption.

5. A secure memory device, as in claim 1, wherein the initialization vector includes the session encryption key during an encryption activation process, said encryption activation process occurring before the encryption of the passwords.

6. A secure memory device for a smart card system, comprising:

an external card reader;
a bidirectional I/O terminal for transmitting data to and receiving data from the external card reader host;
a data storage unit with an EEPROM having a plurality of memory zones, the data storage unit storing a number of READ access passwords and a number of WRITE access passwords; and
a stream-encrypted authentication, encryption and certification (AEC) unit located between the bidirectional I/O terminal and the data storage unit, the stream-encrypted AEC unit controlling access to data received at and transmitted from the bidirectional I/O terminal and the stream-encrypted AEC unit having means for stream encryption to certify authentication of a transaction between the smart card and the external card reader using a dual authentication protocol, the stream-encrypted AEC unit also including a read password protocol utilizing a stream-encrypted read password and a write password protocol utilizing a stream-encrypted write password, wherein the smart card sends data to the card reader upon a successful verification of the read stream-encrypted password and wherein the card reader sends data to the smart card upon a successful verification of the stream-encrypted write password, the stream-encrypted AEC unit and the external card reader both having a stream-encrypted hash function device (HFD) responsive to an initialization vector, the stream-encrypted AEC unit having means for implementing a protocol in which the initialization vector is transmitted to the host card reader and the smart card memory device, whereby at the host card reader, using the HFD for computing authentication challenge A for transmission to the smart card memory device, the stream-encrypted AEC unit having means for using the initialization vector with the HFD to compute verification of challenge A, computing an authentication challenge B for transmission to the host card reader, the host card reader using the HFD to compute verification of challenge B, thereby mutually authenticating the host card reader and the smart card memory device, the AEC unit having means for reading data, the host card reader asserting said stream-encrypted read password to the smart card memory device, at the smart card memory device, the stream-encrypted AEC unit having means for verifying the stream-encrypted read password from the store of READ passwords and sending encrypted data, the host reader having means for accepting the encrypted data, the stream-encrypted AEC unit having means for writing data, the host reader having means for asserting a WRITE password to the smart card memory device, and at the smart card memory device, the stream-encrypted AEC unit having means for verifying the WRITE password from the store of WRITE passwords and accepting encrypted data.

* * * * *